(12) United States Patent
Boquet et al.

(10) Patent No.: US 10,479,239 B2
(45) Date of Patent: Nov. 19, 2019

(54) VEHICLE SEAT AND SEAT ELEMENT COMPRISING AN ERGONOMIC VENTILATION SYSTEM

(71) Applicant: Faurecia Sièges d'Automobile, Nanterre (FR)

(72) Inventors: Mathieu Boquet, Verrieres le Buisson (FR); Florent Longatte, Rambouillet (FR); Didier Duriez, Le Plessis-Pâté (FR); Laurent Chabert, Cerny (FR); Sandeep Bhor, Pune (IN); Izajmahamad Desai, Dist. Kolhapur Tal. Kagal (IN); Stephane Ly, Shanghai (CN)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 8 days.

(21) Appl. No.: 15/828,315

(22) Filed: Nov. 30, 2017

(65) Prior Publication Data
US 2018/0147961 A1    May 31, 2018

(30) Foreign Application Priority Data
Nov. 30, 2016    (FR) ..................... 16 61729

(51) Int. Cl.
*B60N 2/56*    (2006.01)
*B60H 1/00*    (2006.01)
*B60N 2/70*    (2006.01)

(52) U.S. Cl.
CPC ........... *B60N 2/56* (2013.01); *B60H 1/00564* (2013.01); *B60N 2/565* (2013.01); *B60N 2/5657* (2013.01); *B60N 2/7017* (2013.01)

(58) Field of Classification Search
CPC ........ B60N 2/56; B60N 2/5657; B60N 2/565; B60N 2/7017; B60H 1/00564
USPC ........................... 297/180.1, 180.13, 180.14
See application file for complete search history.

(56) References Cited

U.S. PATENT DOCUMENTS

| 6,059,018 A | 5/2000 | Yoshinori et al. | |
| 2011/0187165 A1* | 8/2011 | Oota | B60N 2/5671 297/180.14 |

FOREIGN PATENT DOCUMENTS

| DE | 3306871 A1 | 8/1984 |
| DE | 19830797 A1 | 1/1999 |
| DE | 102010012212 A1 | 5/2012 |
| EP | 2404527 A2 | 1/2012 |
| FR | 2694527 A1 | 2/1994 |
| FR | 2829728 A1 | 3/2003 |
| WO | WO2016106619 A1 | 7/2016 |

* cited by examiner

*Primary Examiner* — Justin V Lewis
(74) *Attorney, Agent, or Firm* — Reising Ethington P.C.

(57) ABSTRACT

A seat element includes a supporting structure, padding resting on the supporting structure and configured to serve as a support for a user, and a ventilation system having at least one fan and at least one duct placing the padding and the fan in communication. The duct is formed of a flexible material which preferably comprises a foam of polyolefin and/or ethylene-propylene-diene monomer (EPDM) and/or acrylonitrile butadiene (NBR).

12 Claims, 3 Drawing Sheets

VEHICLE SEAT AND SEAT ELEMENT COMPRISING AN ERGONOMIC VENTILATION SYSTEM

TECHNICAL FIELD

The invention relates to vehicle seat elements, to vehicle seats comprising such elements, and to the methods for manufacturing these elements.

BACKGROUND

Generally, a seat element comprises a supporting structure, for example a frame, and padding. The supporting structure is rigid and ensures the mechanical stability of the seat element, while the padding, usually soft, ensures that a user seated on the seat element is comfortable.

In addition, the seat element may comprise a ventilation system in communication with the padding by means of one or more ducts. The fan is thus able to blow or suck air into or from a passenger compartment of the vehicle, through the padding. The duct or ducts are formed of a hard and rigid plastic material to provide mechanical strength. The comfort of the seat element is affected as a result, however. The duct or ducts tend to obstruct the compression of the padding by the seated user. The user then feels the duct or ducts.

The most common alternative is to replace the duct or ducts by a woven spacer, also called a "3D mesh", which is more flexible than the rigid duct or ducts. However, the structure of this spacer, which is woven, results in greater air resistance than in a duct and therefore a reduction in the air flow. It is therefore necessary to supply the fan with more energy to achieve an output equivalent to that obtained with a duct or ducts.

SUMMARY

One aim of the invention is to overcome the two aforementioned disadvantages, namely to make certain that the user sitting on the seat is comfortable while ensuring good permeability to air.

To do this, the invention in at least some embodiments provides a seat element comprising a supporting structure, padding resting on the supporting structure and configured to serve as a support for a user, and a ventilation system comprising at least one fan and at least one duct placing the padding and the fan in communication, characterized in that the duct is formed of a flexible material which preferably comprises a foam of polyolefin and/or ethylene-propylene-diene monomer (EPDM) and/or acrylo-nitrile butadiene (NBR) and/or a non-woven thermoformed material.

Note that when the seat element is a seating part, the flexible material preferably comprises ethylene-propylene-diene monomer (EPDM) and/or acrylonitrile butadiene (NBR). When the seat element is a backrest, the flexible material preferably comprises polyolefin foam which advantageously comprises expanded polyethylene. The material may also comprise a non-woven thermoformed material. Such a material provides a suitable compromise between rigidity and flexibility.

The duct, formed of a flexible material, is thus able to deform elastically when the user exerts pressure on the padding. In addition, the flexible material has the property of absorbing the mechanical vibrations produced by the fan when it is attached directly to the duct. The comfort experienced by the user of the seat element is thus increased. In addition, the ventilation system of the seat element, and thus the seat element itself, are simpler to manufacture and shape.

In various embodiments of the seat element according to the invention, one or more of the following provisions may also be used:
  the duct has a "U" or "C" shape; the shape of the duct is thus adapted to the morphology of the user, particularly when the seat element forms a seating part;
  the duct has a non-constant cross-sectional area along its length, said non-constant cross-sectional area being adapted so that the speed of the air flow along the duct is uniform along the duct;
  the duct comprises a plurality of orifices forming fluid inlets and/or outlets;
  the duct comprises attachment means for securing the fan;
  the ventilation system comprises a protective member which surrounds the fan and is formed of a flexible material, preferably the same flexible material as the duct;
  the duct and the protective member are formed as one piece;
  at least a portion of the duct extends along a periphery of the seat element;
  the duct is arranged symmetrically with respect to an axis of symmetry of the seat element which is preferably a longitudinal axis of the seat element;
  the fan is fixed to a central region of the supporting structure;
  the duct opens to a peripheral region of the seat element;
  the seat element forms a seating part;
  the seat element forms a backrest;

The invention further provides a seat comprising at least one seat element as described above.

Finally, the invention in one or more other embodiments provides a method for manufacturing a seat element as mentioned above, comprising at least the following steps:
  the duct is positioned in a mold, and
  a material is injected into the mold so as to form the padding around the duct.

The fan may be attached directly to the duct, for example prior to injection of the material into the mold. It may also be attached to the supporting structure of the seat.

Alternatively, the manufacturing method comprises at least the following steps:
  the padding is formed, with a cavity arranged therein,
  the duct is positioned in the cavity, and
  a sheet is fixed, advantageously by gluing, covering the duct on the padding.

Similarly, the fan may be fixed directly to the duct or to the supporting structure of the seat.

Of course, the different features, variants, and/or embodiments of the invention may be associated with one another in various combinations, to the extent that they are not incompatible with or exclusive of one another.

BRIEF DESCRIPTION OF DRAWINGS

The invention will be better understood and other features and advantages will be further apparent from reading the following detailed description which includes two embodiments, given by way of illustration with reference to the appended figures, presented as non-limiting examples which may serve to complete the understanding of the invention and the description of its implementation, and where appropriate to contribute to its definition, in which.

DETAILED DESCRIPTION

For the sake of clarity, only the elements useful in understanding the described embodiments are represented and will be detailed.

Figure 1:
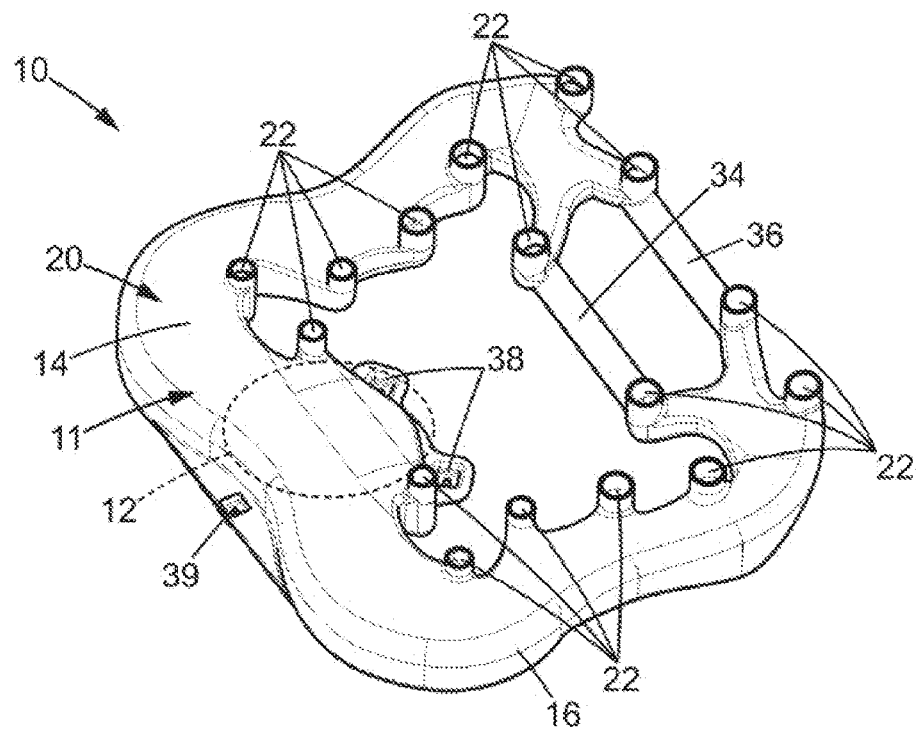
FIG. 1 is a perspective view of a ventilation system for a seat element, in this case a seating part, according to a first embodiment of the invention.

A ventilation system 10 for a seat element according to a first embodiment of the invention is represented in FIG. 1.

The ventilation system 10 comprises a main member which forms a duct 11, and a fan 12 (whose location is indicated). The duct 11 comprises, near the location for the fan 12, two attachment lugs 38 and a catch recess 39. The fan 12 comprises three complementary members, respectively for the two lugs 38 and the catch recess 39, and is thus fixed to the duct 11.

The two attachment lugs 38 and the catch recess 39 of the duct 11 thus form fastening means for securing the fan 12 to the duct 11.

The duct 11 has a "C" or "U" shape. It comprises a left arm 14 and a right arm 16 which are symmetrical, and each forms an arm of the "C" or "U". The arms 14 and 16 are symmetrically arranged one on either side of the fan 12.

The duct 11 is formed of a flexible material. In this embodiment, the flexible material is an elastomer, namely ethylene-propylene-diene monomer which is also known by the acronym EPDM. Alternatively, the flexible material is acrylonitrile butadiene, also known by the acronym NBR. More generally, the flexible material may be any type of synthetic or natural elastomer, in particular a rubber.

In addition, the arms 14 and 16 each comprise a plurality of orifices 22. The orifices 22 place the interior of the duct 11 in fluid communication with the exterior of the duct. As a result, the fan 12 is in communication with the exterior of the duct 11, by means of the arms 14 and 16.

As illustrated in FIG. 1, the arms 14 and 16 have one end in immediate proximity to the fan 12 and one end furthest from the fan. These two ends are structurally connected by two mechanical links 34, 36 which serve to improve the mechanical strength of the duct 11, in particular during handling and for better integration into a mold to shape the padding as described below.

In addition, as can be seen in FIG. 1, the arms 14 and 16 of the duct 11 have a cross-sectional area that is non-constant and therefore of variable size. This cross-sectional area is larger near the fan and progressively decreases according to the number of orifices 22 and their respective positions and cross-sectional dimensions. This variation in the cross-sectional area is aerodynamically optimized so that the speed of the air flow along the duct 11, within the arms 14 and 16, is substantially uniform.

Figure 3:
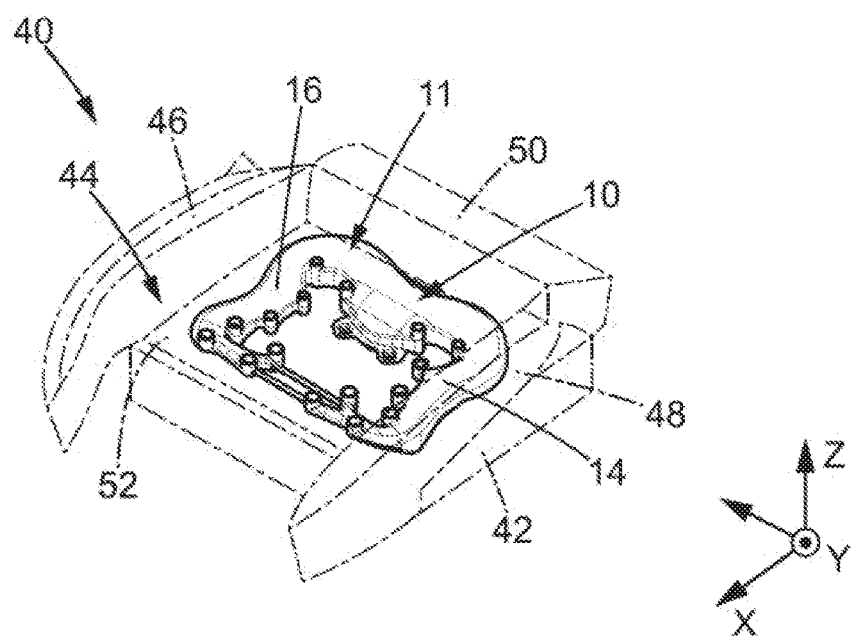
FIG. 3 is a perspective view of a seat element, in this case a seating part, comprising the ventilation system integrated into a seat cushion.

Represented in FIG. 3 is a seat element according to the first embodiment of the invention. The seat element here is a seating part 40 comprising the ventilation system 10. The seating part 40 is intended to be part of a vehicle seat.

The seating part 40 comprises a supporting structure 42, padding 44, and the ventilation system 10 formed by the duct 11 and the fan 12. The seating part 40 has a longitudinal axis (X) which is parallel to a longitudinal axis of the vehicle when the seating part 40 is mounted therein, and a transverse axis (Y). As can be seen in FIG. 3, the seating part 40 has an axis of symmetry which is parallel to the longitudinal axis (X).

The supporting structure 42 gives the seating part 40 the necessary structural support. In addition, the supporting structure 42 is adapted to be connected to the floor of the passenger compartment of the vehicle, for example by means of rails. The supporting structure 42 may be of any type and may in particular comprise a metal frame.

The padding 44 ensures that a user of the seating part 40 is comfortable. It is configured to serve as a support for the user. The padding 44 rests on the supporting structure 42. It comprises a layer of synthetic foam that is soft and cushioning. It has two transverse portions 46 and 48 called side strips, a rear portion 50, and a main portion 52 which connects portions 46, 48, and 50.

The ventilation system 10 is integrated into the main portion 52. The orifices 22 of the arms 14 and 16 are arranged near the upper surface, with reference to the vertical direction (Z), of the main portion 52 of the padding 44. The arms 14 and 16 thus place the padding 44 and the fan 12 in communication. The two arms 14, 16 are also arranged symmetrically with respect to the axis of symmetry of the seating part 40. In addition, the cover (not shown in FIG. 3), which helps to conceal the padding 44, is permeable to air. The fan 12 can thus push air through the air-permeable cover covering the padding 44 or conversely can pull air through the cover, in order to improve user comfort. In addition, as illustrated in FIG. 4, the general "C" or "U" shape of the arms 14 and 16 allows them to be placed in proximity to the respective transverse portions 48, 46.

The orifices 22 form air inlets and/or outlets. Thus, depending on the desired goal, the fan 12 can be configured to pull air from the seating part 40 or conversely to push air into the seating part 40.

Figure 4A:
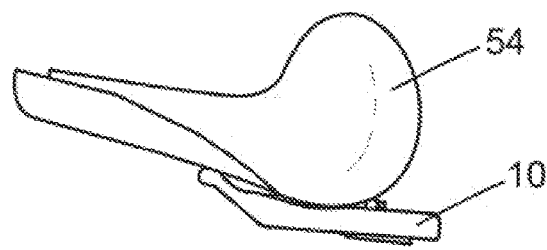
FIGS. 4A to 4C are schematic illustrations of the ventilation system and of a user seated on the seat element.
Figure 4B:
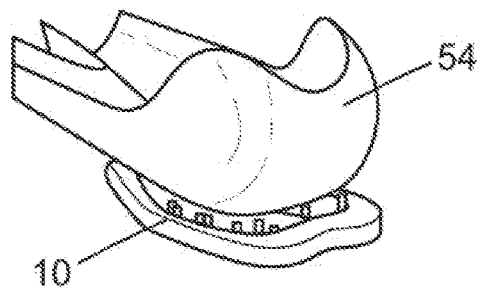
Figure 4C:
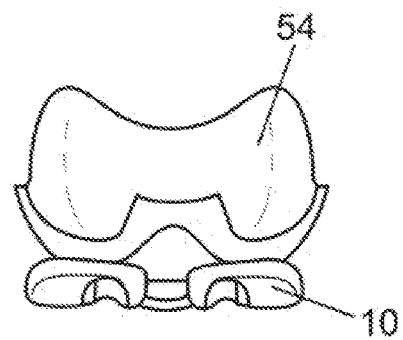

FIGS. 4A to 4C schematically represent the user's rear 54 and its position relative to the ventilation system 10 when the user is sitting on the seating part 40. Due to the "C" or "U" shape of the arms 14 and 16, they follow the contours of the user's rear 54. As is schematically represented, the "C" or "U" shape of the two arms 14, 16 allows the ventilation system 10 to form a seat. The user therefore feels more comfortable. In addition, this "C" and "U" shape, as well as the plurality of orifices, optimize air circulation in the cover and thus improve the quality of the ventilation.

Figure 5:
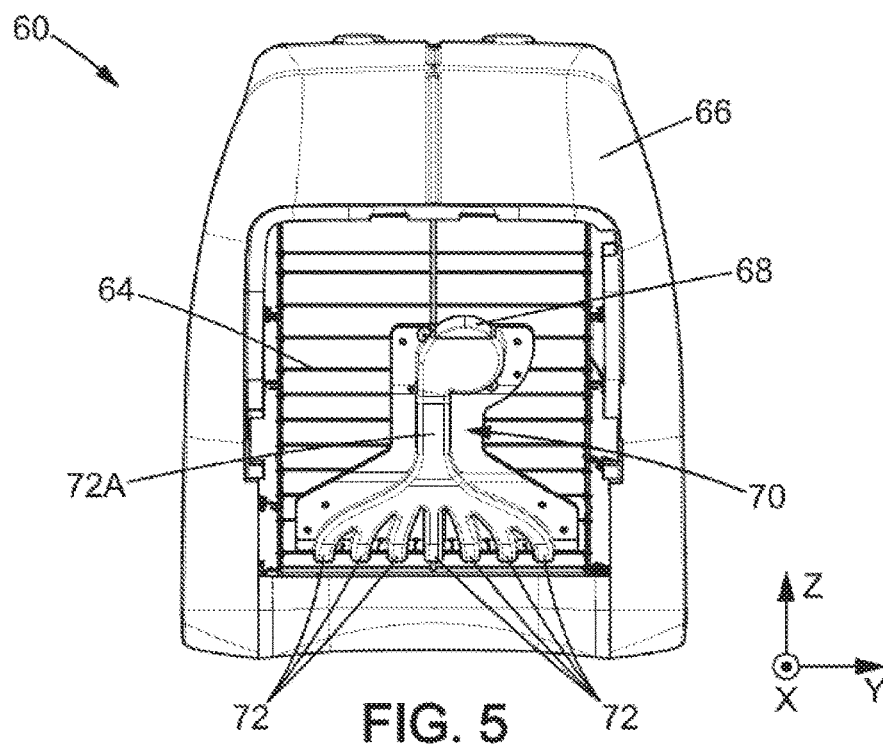
FIG. 5 is a rear view of a seat element, in this case a backrest, according to a second embodiment.
Figure 6:
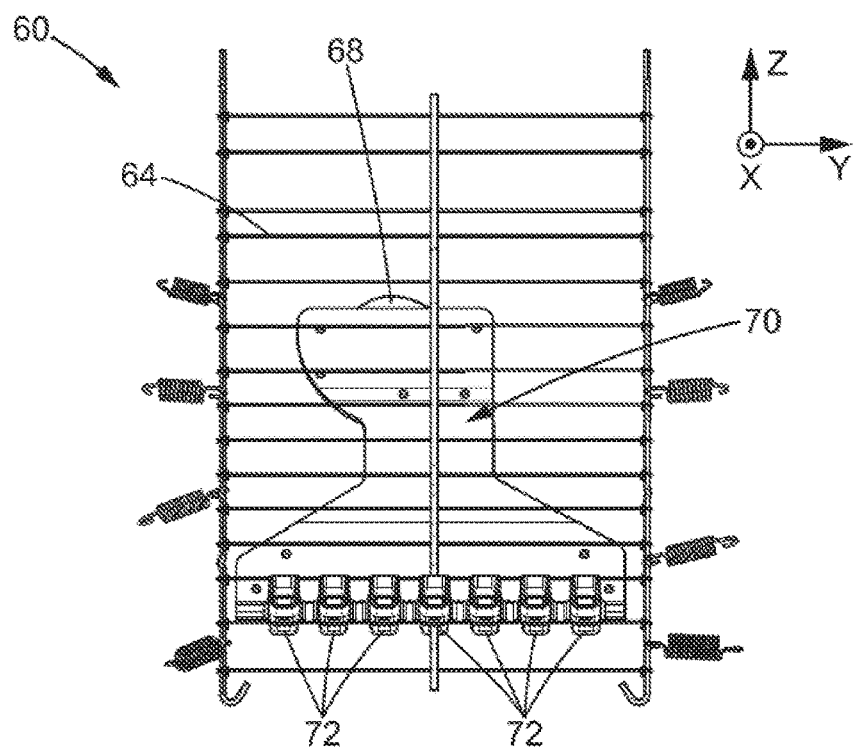
FIG. 6 is a front view of the seat element.

Represented in FIGS. 5 and 6 is a seat element comprising a ventilation system 62 according to a second embodiment. Only the differences from the first embodiment will be explained.

The seat element here is a backrest 60. It also comprises a supporting structure 64 and padding 66. Three spatial directions are represented in FIGS. 5 and 6: the longitudinal direction (X), the transverse direction (Y), and the vertical direction (Z). These three directions are the same as those used to describe the seating part 40. The backrest 60 is therefore represented in the position of use. In FIG. 5, the backrest 60 is shown in a back view. Part of the padding 66 has been omitted in order to illustrate the ventilation system

62. Again, the ventilation system 62 is integrated into the padding 66. In FIG. 6, the backrest is shown in a front view, but the padding 66 has been completely omitted for clarity.

The ventilation system 62 comprises a fan 68, protected by a protective member 70 which defines a plurality of ducts 72. The protective member 70 and the ducts 72 are therefore formed as one piece. These ducts 72 place the fan 68 and the padding 66 in communication. The protective member 70, and therefore the ducts 72, are formed of a flexible material which may in particular be of thermoformed polyolefin foam, which may in particular be expanded polyethylene, or one of the other listed materials. The flexible material may also be a non-woven thermoformed material. The ducts 72 comprise a common portion 72A, near the fan 68, and an individually distinct portion that opens to an orifice forming a fluid inlet and/or outlet. In addition, the fan 68 is attached to a central region of the supporting structure 64, with reference in particular to the transverse (Y) and vertical (Z) directions. In contrast, the ducts 72 open into a lower peripheral region with reference to the vertical direction (Z). They are regularly distributed along the transverse direction (Y), however.

A method for manufacturing the seating part 40 will now be described. The method may also be used to manufacture the backrest 60.

First, the duct 11 is formed of flexible material. It may be produced by injection, by blowing, or by thermoforming one of the flexible materials listed. Next, the duct 11 is positioned in a mold in order to form the padding 44 all around the duct 11. Then, a material intended for forming the padding 44 is injected into the mold.

Next, the padding 44 comprising the duct 11 is attached to the supporting structure 42. The fan is then attached to the duct 11 by means of the attachment lugs 38 and the catch recess 39. These last two steps may be reversed.

Alternatively, the padding 44 is initially formed in the mold while defining a cavity in the padding 44. Next, the duct 11 is positioned in the cavity of the padding 44. The duct 11 may be glued to the padding 44 or else the duct 11 is positioned between the cavity of the padding 44 and a sheet which itself is glued to the padding 44.

Of course, many variants of the invention may be made without departing from its scope.

In particular, one can vary the number of air inlet and/or outlet orifices 22 as well as the number of arms 14, 16.

Figures 2A, 2B:
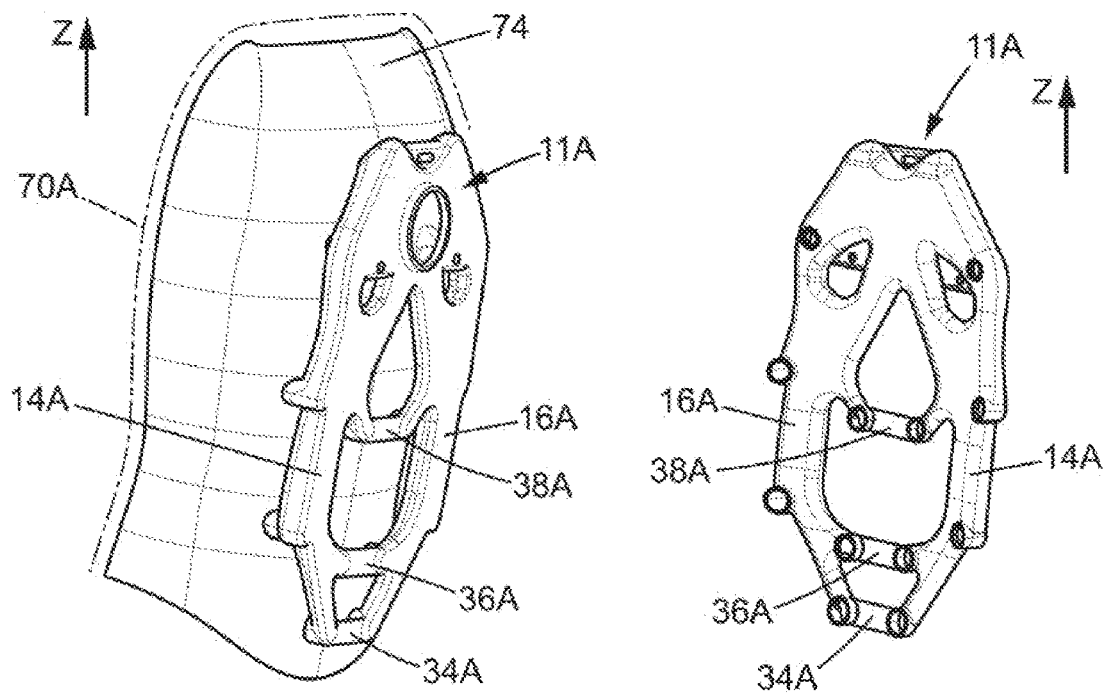
FIG. 2A is a perspective view of the relative positions of the back of a user of a seat element, in this case a backrest, and of a duct in a variant of the ventilation system equipping the seat element.
FIG. 2B is a perspective view of the duct of FIG. 2A.

It is also possible to position, in the backrest 60, a duct that has a "C" or "U" shape in a manner that follows the contours of the user's back when the user is sitting in a seat comprising said backrest 60. This configuration is illustrated in FIG. 2A. In this figure, the relative positions of a duct 11A, also illustrated alone in FIG. 2B and which is a variant of duct 11, and a user's back 74 are represented. As can be seen in this figure, the duct 11A has a left arm 14A and a right arm 16A. These two arms extend longitudinally in the vertical direction (Z) so as to follow the contours of the user's back 74. The user thus experiences increased comfort. Duct 11A is distinguished from duct 11 in that it comprises three mechanical links 34A, 36A, 38A connecting the two arms 14A, 16A.

The invention claimed is:

1. A seat element comprising a supporting structure, padding resting on the supporting structure and configured to serve as a support for a user, and a ventilation system comprising at least one fan to generate an air flow and at least one duct placing the padding and the fan in communication, wherein the duct is formed of a flexible material and extends from a proximal end at the fan to a distal end, the duct having a plurality of orifices forming fluid inlets or outlets between the proximal end and the distal end, wherein a cross-sectional area of the duct decreases from the proximal end to the distal end according to the number of orifices and their respective positions and cross-sectional dimensions so that the air flow has a uniform speed along the duct.

2. A seat element according to claim 1, wherein the flexible material comprises a foam of polyolefin and/or ethylene-propylene-diene monomer (EPDM) and/or acrylonitrile butadiene (NBR) and/or a non-woven thermoformed material.

3. A seat element according to claim 1, wherein the duct has a "U" or "C" shape.

4. A seat element according to claim 1, wherein the duct comprises attachment means for securing the fan.

5. A seat element according to claim 1, comprising a protective member which surrounds the fan and is formed of a flexible material, the duct and the protective member being formed as one piece.

6. A seat element according to claim 5, wherein the flexible material of the protective member is the same material as the flexible material of the duct.

7. A seat element according to claim 1, forming a seating part.

8. A seat element according to claim 1, forming a backrest.

9. A seat comprising at least one seat element according to claim 1.

10. Method A method for manufacturing a seat element according to claim 1, comprising at least the following steps:
positioning the duct in a mold, and
injecting a material into the mold so as to form the padding around the duct.

11. A seat element, comprising:
a supporting structure;
padding over the supporting structure to support a user;
a duct formed of a flexible material and extending between first and second ends;
a fan at the first end of the duct, the fan being configured to generate an air flow in the duct; and
a plurality of orifices formed along the duct that place an interior of the duct in communication with the padding, the orifices being spaced apart between the ends of the duct,
wherein the duct has a cross-sectional area that decreases from the first end of the duct to the second end of the duct such that the air flow has a uniform speed between the first and second ends of the duct.

12. A seat element according to claim 11, wherein the cross-sectional area of the duct decreases according to the number of orifices, respective positions of the orifices, and respective cross-sectional dimensions of the orifices.

* * * * *